(12) United States Patent
Cash

(10) Patent No.: US 10,830,905 B2
(45) Date of Patent: Nov. 10, 2020

(54) VERTICAL ACCURACY IMPROVEMENTS FOR DYNAMIC REAL-TIME KINEMATIC REFERENCE STATIONS

(71) Applicant: Trimble Inc., Sunnyvale, CA (US)

(72) Inventor: Michael Cash, Mountain View, CA (US)

(73) Assignee: Trimble Inc., Sunnyvale, CA (US)

( * ) Notice: Subject to any disclaimer, the term of this patent is extended or adjusted under 35 U.S.C. 154(b) by 223 days.

(21) Appl. No.: 16/193,129

(22) Filed: Nov. 16, 2018

(65) Prior Publication Data

US 2020/0158884 A1   May 21, 2020

(51) Int. Cl.
*G01S 19/44*   (2010.01)
*G01S 19/36*   (2010.01)

(52) U.S. Cl.
CPC .............. *G01S 19/44* (2013.01); *G01S 19/36* (2013.01)

(58) Field of Classification Search
CPC .......... G01S 19/44; G01S 19/36; G01S 19/32; G01S 19/43; G01S 19/04
USPC ..................................... 342/357.27
See application file for complete search history.

(56) References Cited

U.S. PATENT DOCUMENTS

| | | | |
|---|---|---|---|
| 5,523,761 A | 6/1996 | Gildea | |
| 6,100,842 A | 8/2000 | Dreier et al. | |
| 6,140,959 A | 10/2000 | Gudat et al. | |
| 6,531,981 B1 | 3/2003 | Fuller et al. | |
| 6,799,166 B2 | 9/2004 | Robbins | |
| 7,340,343 B2 | 3/2008 | Petvski et al. | |
| 8,983,685 B2 | 3/2015 | Dai et al. | |
| 2007/0180716 A1* | 8/2007 | Hertzman | G01C 15/002 33/290 |
| 2009/0121927 A1 | 5/2009 | Moshfeghi | |
| 2010/0166044 A1 | 7/2010 | Offer | |
| 2011/0024559 A1* | 2/2011 | McGeer | B64F 5/40 244/110 F |

(Continued)

FOREIGN PATENT DOCUMENTS

| | | |
|---|---|---|
| JP | 09-061509 | 7/1997 |
| WO | WO-2018-022710 | 2/2018 |

OTHER PUBLICATIONS

El-Hallaq, Surveying Errors and Adjustments Training Course, Apr. 2011, 38 pages.

(Continued)

*Primary Examiner* — Harry K Liu
(74) *Attorney, Agent, or Firm* — Adsero IP

(57) ABSTRACT

A system for vertical accuracy improvement includes a reference station, a rover, and a base station in communication with the reference station and the rover. The base station includes a GNSS antenna, an actuator coupled to the GNSS antenna, a wireless transceiver, a processor, and non-transitory computer readable media comprising instructions executable by the processor. The instructions may be executed to cause the base station to receive a first vertical error from the reference station. The base station may further be configured to determine a second vertical position at which the first vertical error is reduced, and adjust the GNSS antenna to be in the second vertical position. The base station may further be configured to generate correction data based at least in part on the phase of the carrier wave signal at the second vertical position, and transmit the correction data to the rover.

20 Claims, 7 Drawing Sheets

(56) References Cited

U.S. PATENT DOCUMENTS

| | | | |
|---|---|---|---|
| 2011/0231061 A1* | 9/2011 | Reeve | A01B 79/005 701/41 |
| 2012/0050095 A1* | 3/2012 | Scherzinger | G01S 19/47 342/357.3 |
| 2016/0146942 A1* | 5/2016 | McDonald | G01S 19/07 342/357.44 |
| 2018/0031711 A1 | 2/2018 | Cash et al. | |
| 2018/0284293 A1* | 10/2018 | Pan | G01S 19/43 |
| 2019/0317224 A1* | 10/2019 | Miya | G01S 19/43 |

OTHER PUBLICATIONS

Lightbody et al., Techniques in Relative RTK GNSS Positioning, 2010, 6 pages.

U.S. Appl. No. 15/223,877, Final Office Action, dated Sep. 12, 2019, 16 pages.

International Patent Application, EP-19208923.3, dated Nov. 13, 2019, 59 pages.

U.S. Appl. No. 15/223,877, Non-Final Office Action, dated Jan. 17, 2020, 15 pages.

Euler, H.J., "Reference Station Network Information Distribution", Dec. 2, 2005, 6 pages http://www.wasoft.de/e/iagwg451/euler/euler.html.

Oct. 26, 2017 PCT-ISA-206 Invitation to Pay Additional Fees, PCT/US2017/043879, 11 pages.

International Search Report and Written Opinion for Application No. PCT/US2017/043879, dated Jan. 4, 2018, 19 pages.

Extended European Search Report for International Patent Application, EP-19208923.3 dated Apr. 20, 2020, 8 pages.

Wanninger et al., Article: Controlled Antenna Changes at GNSS Reference Stations, Institute of Navigation, dated Sep. 22, 2009, 9 pages.

U.S. Appl. No. 15/223,877, Notice of Allowance, dated Jun. 15, 2020, 8 pages.

* cited by examiner

VERTICAL ACCURACY IMPROVEMENTS FOR DYNAMIC REAL-TIME KINEMATIC REFERENCE STATIONS

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to grade control systems, and more particularly to tools and techniques for improving the vertical accuracy of grade control systems.

BACKGROUND

Grade control systems are used for levelling and land forming operations in various contexts, such as agriculture, earth moving, surveying, and construction. Conventional dynamic grade control systems typically utilize inputs from a global navigation satellite system (GNSS) to determine the vertical position (e.g., elevation) of a GNSS receiver. Real-time kinematic (RTK) positioning is a technique used to enhance the precision of position data by relying on a range calculation based on the carrier wave of the GNSS signal. This range calculation, however, includes errors, such as GNSS drift, typically introduced by atmospheric effects. RTK relies on the use of a single reference base station, located at a known location to provide corrections to the position data of a GNSS rover. Thus, accuracy of the relative positions of the GNSS base station and GNSS rover are improved.

One approach to address this has been to deploy a stationary GNSS rover (e.g., a reference station) to monitor RTK GNSS elevation data. The elevation data from the stationary GNSS rover is sent to the GNSS base station, which then adjusts the height of the GNSS antenna at the base station such that the elevation reported at the stationary GNSS rover is near-constant. A dynamic GNSS rover (mounted to a tractor or scraper performing levelling operations) may then be deployed and given the same corrections as the stationary GNSS rover. Thus, the vertical accuracy of dynamic GNSS rover may be improved, relative to the stationary GNSS rover. However, in this arrangement, accuracy is only improved for vertical position relative to the stationary GNSS rover, and accuracy decreases as the distance between the dynamic GNSS rover and stationary GNSS rover increases.

Accordingly, tools and techniques for improving the vertical accuracy of a dynamic grade control system are provided.

BRIEF DESCRIPTION OF THE DRAWINGS

A further understanding of the nature and advantages of the embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

Figure 1:
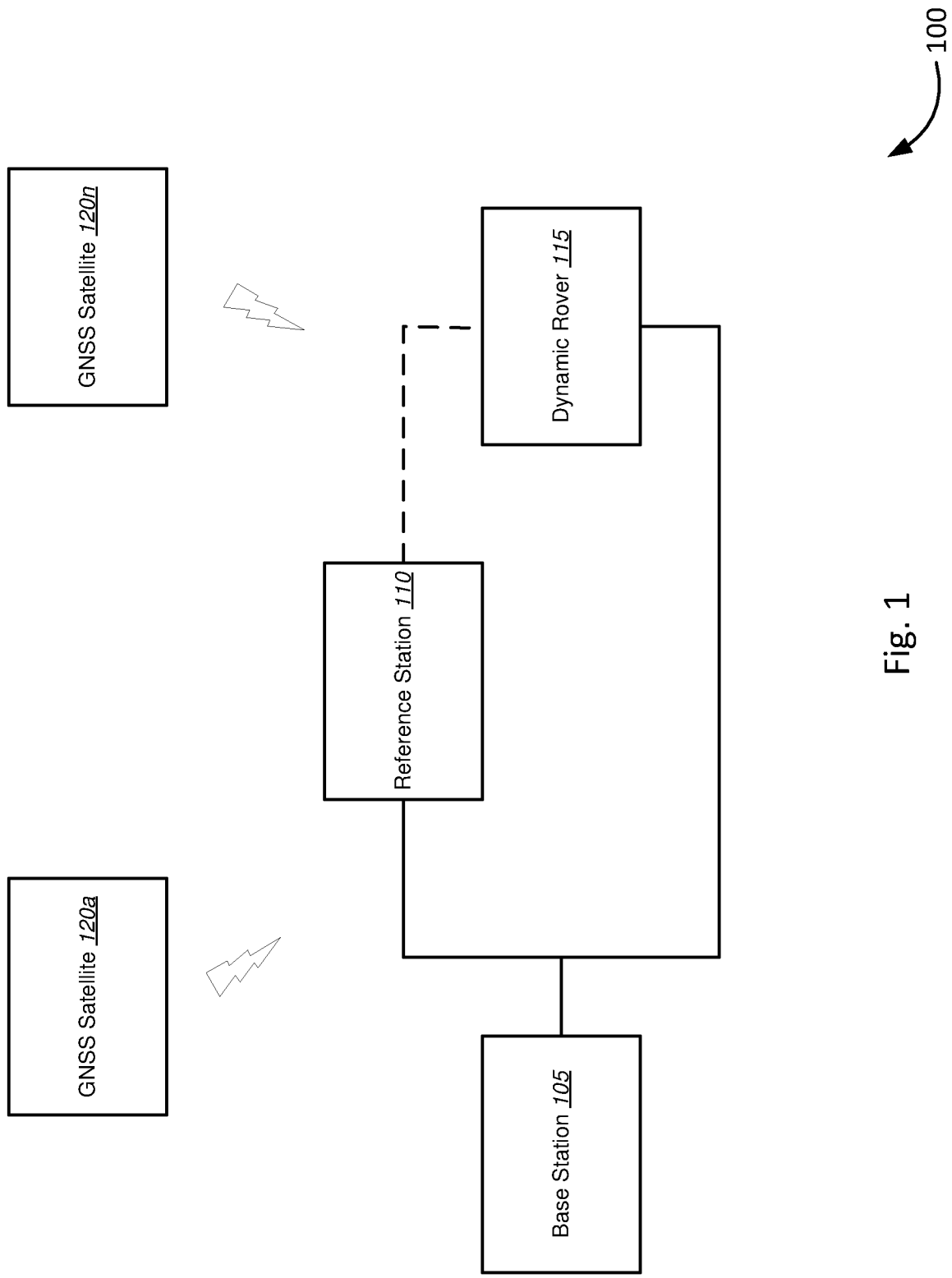
FIG. 1 is a schematic block diagram of a system for improved vertical accuracy RTK reference stations, in accordance with various embodiments.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

The various embodiments include, without limitation, methods, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible, and/or non-transitory computer readable media (such as, to name but a few examples, optical media, magnetic media, and/or the like).

In an aspect, a system for vertical accuracy improvement in dynamic RTK systems includes a reference station, rover, and base station. The reference station may include a first global navigation satellite system (GNSS) antenna in communication with a GNSS satellite, wherein the reference station is configured to determine a first vertical position and a first vertical error in the first vertical position based, at least in part, on a phase of a carrier wave signal of the GNSS satellite. The rover may include a second GNSS antenna in communication with the GNSS satellite. The base station may be in communication with one or more global navigation satellites, the one or more reference stations, and the rover. The base station may further include a third GNSS antenna, an actuator coupled to the third GNSS antenna configured to adjust a vertical position of the third GNSS antenna, and wireless transceiver, a processor, and non-transitory computer readable media comprising instructions executable by the processor. The instructions may be executed by the processor to receive, via the reference station, the first vertical error, wherein the first vertical error is based at least in part on the phase of the carrier wave signal when the third GNSS antenna is at a first vertical position. The instructions may further be executed by the processor to determine a second vertical position wherein movement of the third GNSS antenna to the second vertical position produces a modified first vertical error at the reference station less than the first vertical error. The instructions may further be executable to adjust, via the actuator, the third GNSS antenna to be in the second vertical position, generate correction data based at least in part on the phase of the carrier wave signal of the GNSS satellite received by the third GNSS antenna at the second vertical position, and transmit, via the wireless transceiver, the correction data to the rover. The rover may be configured to determine a corrected vertical position based, at least in part, on the correction data.

In another aspect, an apparatus for vertical accuracy improvement in dynamic RTK systems includes a global navigation satellite system (GNSS) antenna in communication with a GNSS satellite, an actuator coupled to the GNSS antenna configured to adjust a vertical position of the GNSS antenna, a wireless transceiver, a processor, and non-transitory computer readable media comprising instructions executable by the processor. The instructions may be executed by the processor to receive, via a reference station, a first vertical error indicative of an error in a measured vertical position of the reference station, wherein the first vertical error is based at least in part on a phase of a carrier wave signal of the GNSS satellite when the GNSS antenna is at a first vertical position. The instructions may further be executed by the processor to determine a second vertical position, wherein movement of the GNSS antenna to the second vertical position produces a modified first vertical error at the reference station less than the first vertical error. The instructions may further be executed to adjust, via the actuator, the GNSS antenna to be in the second vertical position. The instructions may further be configured to cause the base station to generate correction data based at least in part on the phase of the carrier wave signal of the GNSS satellite received by the GNSS antenna at the second vertical position, and transmit, via the wireless transceiver, the correction data to a GNSS rover.

In a further aspect, a method for vertical accuracy improvement in dynamic RTK systems includes receiving, via a base station, a first vertical indicative of an error in a measured vertical position of the reference station, wherein the first vertical error is based at least in part on a phase of a carrier wave signal of the GNSS satellite when a GNSS antenna is at a first vertical position. The method may continue by determining, via the base station, a second vertical position, wherein movement of the GNSS antenna to the second vertical position produces a modified first vertical error at the reference station less than the first vertical error. The method further includes adjusting, via an actuator, the GNSS antenna to be in the second vertical position. The method continues by generating, via the base station, correction data based at least in part on the phase of the carrier wave signal of the GNSS satellite received by the GNSS antenna at the second vertical position, and transmitting, via a wireless transceiver of the base station, the correction data to a GNSS rover.

Various modifications and additions can be made to the embodiments discussed without departing from the scope of the invention. For example, while the embodiments described above refer to specific features, the scope of this invention also includes embodiments having different combination of features and embodiments that do not include all the above described features.

Embodiments described herein improve position measurement accuracy in differential GNSS systems. They can be particularly useful for improving vertical position measurement accuracy. In an embodiment, for example, a GNSS reference station can be positioned near an area where position measurements will be performed. The GNSS reference station can determine its position using corrections from a GNSS base station and signals received from GNSS satellites. Multiple position measurements taken by the GNSS reference station over a period of time can be used to compute an average position. A difference between the average position and an instantaneous position measurement can be used to determine a position correction. A GNSS rover can use the position correction, along with its own position measurements, to improve position measurement accuracy. The position correction essentially decreases variability caused, for example, by short-term differences in the troposphere and/or ionosphere between the GNSS base station and the GNSS rover, using as a proxy the short-term differences in the troposphere and/or ionosphere between the GNSS base station and the GNSS reference station.

FIG. 1 is a schematic block diagram of a system 100 for improved vertical accuracy RTK reference stations, in accordance with various embodiments. The system 100 includes a base station 105, reference station 110, dynamic rover 115, and one or more GNSS satellites 120a-120n (collectively referred to as the GNSS satellites 120). It should be noted that the various components of the system 100 are schematically illustrated in FIG. 1, and that modifications to the system 100 may be possible in accordance with various embodiments.

In various embodiments, the base station 105 may be coupled to the reference station 110, and dynamic rover 115. The base station 105 may further be in communication with the one or more GNSS satellites 120a-120n. The reference station 110 may similarly be in communication with the one or more GNSS satellites 120a-120n. The reference station 110 may, in some example, further be coupled to the dynamic rover 115. The dynamic rover 115 may similarly be coupled to the one or more GNSS satellites 120a-120n.

In various embodiments, the base station 105 may be a GNSS base station in communication with one or more GNSS satellites 120a-120n. For example, the base station 105 may include a GNSS receiver and antenna in communication with a constellation of GNSS satellites 120. The one or more GNSS satellites 120a-120n may depict the GNSS satellites in view of the base station 105. While only two GNSS satellites 120a, 120n are shown, and in some examples embodiments are described with respect to only a single GNSS satellite, it is to be understood that 3 or more satellites are typically required to determine a position solution, and that "n" number of satellites are in view of the base station 105 at any given time, the "n-th" GNSS satellite represented by GNSS satellite 120n.

Accordingly, the base station 105 may be configured to receive position data from the one or more GNSS satellites 120a-120n to determine the base station's 105 own geospatial position. It is to be understood that the base station 105 is not limited to any particular GNSS system, and may utilize various types of GNSS systems including, without limitation, the Global Positioning System (GPS), Global Navigation Satellite System (GLONASS), Galileo, BeiDou Navigation Satellite System (BDS), or any other suitable GNSS systems.

The base station 105 may further be configured to generate correction data and transmit the correction data to the reference station 110 and/or dynamic rover 115. For example, according to various embodiments, the base station 105 may include a wireless transceiver configured to communicate with the reference station 110 and dynamic rover 115. In various embodiments, the wireless transceiver may include, without limitation, a modem, radio, a wireless network card, an infrared transceiver, or other wireless communication device and/or chipset (such as a Bluetooth™ transceiver, an 802.11 transceiver, a WiFi device, a WiMax device, a WWAN device, a Z-Wave device, a ZigBee device, cellular communication facilities, etc.), and/or a low-power wireless device (such as a LoRaWAN or LPWAN device), in communication with a corresponding wireless transceiver of the reference station 110 and/or dynamic rover 115.

In various embodiments, the base station 105 may be configured to generate correction data based on a carrier wave phase of a signal received from a GNSS satellite 120a-120n. For example, the base station 105 may be configured to provide RTK corrections based on a phase of the carrier wave signal received by the base station 105. In some embodiments, for example, the base station 105 may be configured to broadcast a phase of the carrier wave seen by the base station 105. The reference station 110 and/or dynamic rover 115 may, in turn, be configured to perform error correction of their respectively determined vertical positions based on differences in the phase of the carrier wave seen at the respective locations of the reference station 110 and dynamic rover 115, relative to the correction data.

According to various embodiments, an improvement to the accuracy of RTK adjustments over conventional RTK techniques is provided by the base station 105. Specifically, the base station 105 may further be configured to monitor vertical error determined to be present in the vertical position reported by the reference station 110. For example, in various embodiments, the vertical error may represent the difference in vertical position (e.g., the distance corrected) between an RTK-corrected vertical position and the uncorrected vertical position reported by the reference station 110. The base station 105 may further be configured to adjust the height of the GNSS antenna of the base station 105. Accordingly, the base station 105 may include a vertical actuator, coupled to the GNSS antenna, and a controller configured to cause the vertical actuator to raise or lower the height of the GNSS antenna as described below. Suitable vertical actuators may include, without limitation, various linear actuators and motors, electric motors, hydraulic motors and pumps, pneumatic pumps, and the like.

By adjusting the height of the GNSS antenna of the base station 105, the vertical error would undergo an equal (but opposite in magnitude) change. For example, adjustments to the height of the GNSS antenna will also change the carrier wave phase at the GNSS antenna. Thus, a change in the height of GNSS antenna will concurrently cause a change in the vertical error determined by the reference station 110. Accordingly, in various embodiments, the height of the GNSS antenna may be adjusted from a starting vertical position of the GNSS antenna to a modified vertical position of the GNSS antenna, where at the modified vertical position, the vertical error at the reference station 110 is halved (in magnitude) from the vertical error seen at the starting vertical position. Described another way, the base station 105 may be configured to adjust the vertical position of the GNSS antenna to the modified vertical position where a vertical error at the reference station 110, as determined based on the modified vertical position of the GNSS antenna, is equal to but opposite a vertical error that would be seen at the base station 105 for the GNSS antenna at the modified vertical position relative to the starting vertical position. Thus, the vertical error that would be seen at the base station 105 is a vertical error that would be present for the GNSS antenna at the modified vertical position relative to the carrier wave phase that would be seen by the GNSS antenna of the base station 105 at the starting vertical position.

For example, if the vertical error is determined to be +1 inch at the reference station 110 (e.g., the RTK-corrected vertical position is 1 inch higher than the uncorrected position), the base station 105 may be configured to lower the height of the GNSS antenna by −½ inch (to halve the reported vertical error). Similarly, if the vertical error is determined to be −1 inch, the base station may raise the height of the GNSS antenna by +½ inch. Continuing with the examples above, if after the height of the GNSS antenna is adjusted, an additional error of +½ inch occurs at the reference station 110, the base station 105 may again move the GNSS antenna to reflect an equal but opposite vertical error as described above. For example, if an additional +½ inch error occurs at the reference station 110, the GNSS antenna may be lowered by −¼ inch. Thus, the base station 105 may be configured to adjust the vertical position of the GNSS antenna such that a vertical error at the reference station 110, determined relative to a starting vertical position of the GNSS antenna before any adjustments have been made, is halved by making an adjustment to the vertical position of the GNSS antenna from the starting vertical position of the GNSS antenna that is half of the vertical error at the reference station, but in the opposite direction.

In some embodiments, the base station 105 may be configured to adjust the height of the GNSS antenna substantially in real-time, minus processing and transmission delays, and the time to physically actuate the GNSS antenna (e.g., the speed of the linear actuator). Alternatively, the base station 105 may be configured to perform height adjustments of the GNSS antenna periodically, for example, at a given polling rate. In yet further embodiments, the height of the GNSS antenna may be adjusted upon request by a user at the base station 105, or via request from the reference station 110 and/or dynamic rover 115.

Although the above example describes an algorithm for adjusting the height of the GNSS antenna to produce equal, but opposite vertical errors at the base station 105 and the reference station, in other embodiments, the base station 105 may be configured to utilize other algorithms. For example, in some embodiments, the height of the GNSS antenna of the base station 105 may be adjusted according to a weighting algorithm. In one example, the height of the GNSS antenna of the base station 105 may be adjusted as a function of the proximity of the dynamic rover 115 to the reference station 110. The base station 105 may further be configured to adjust the height of the GNSS antenna to produce less vertical error (e.g., 0 vertical error) at the reference station 110 the closer the dynamic rover 115 is to the reference station 110. As the dynamic rover 115 moves further away from reference station 110, the height of the GNSS base station antenna may be adjusted to halve the vertical error at the reference station 110, as previously described. In other words, as the dynamic rover 115 moves away from the reference station 110, the height of the GNSS antenna may be adjusted to allow the vertical error at the reference station 110 to increase closer to the half vertical error adjustment described above, or alternatively, in some embodiments, as the dynamic rover 115 moves closer to the base station 105, to reduce vertical error at the base station 105 (by gradually returning the GNSS antenna to the starting vertical position as function of the distance between the dynamic rover 115), as opposed to reduction of the vertical error at the reference station 110.

The correction data provided by the base station 105 may, accordingly, be dynamically changing according to the height of the GNSS antenna of the base station 105. Thus, the dynamic rover 115 may be configured to perform its own vertical position correction based on the correction data of the base station 105. As described above, an advantage of reducing the vertical error at the reference station 110 is that the vertical position of the dynamic rover 115 is improved as the dynamic rover 115 moves into closer proximity with the reference station 110. However, the base station 105 described above provides further advantages over using a simple zero error reference station 110 setpoint (e.g., adjusting the height of the GNSS antenna to always produce zero vertical error at the reference station). In such conventional systems, accuracy of the corrections to the vertical position of the dynamic rover 115 decreases the further away the dynamic rover 115 moves from the reference station 110 and provides little or no improvement as the dynamic rover 115 moves closer to the base station 105. By using the weighting algorithm, or producing equal, but opposite vertical error at the base station 105 and reference station 110, the accuracy of the corrected vertical position of the dynamic rover 115 is improved over a larger area.

In various embodiments, the dynamic rover 115 may be a moving GNSS rover. For example, in some embodiments, the dynamic rover 115 may comprise a GNSS antenna coupled to a tractor, scraper, or another moving piece of equipment. In further embodiments, the dynamic rover 115 may be moved manually by a user of the system 100. The dynamic rover 115, like the base station 105 and reference station 110 may be configured to determine its vertical position based on position data received from the one or more GNSS satellites 120a-120n. The dynamic rover 115 may further be configured to perform RTK corrections based on the correction information from the base station 105 to correct a vertical error seen at the dynamic rover 115. Accordingly, the vertical position of the dynamic rover 115 may be more accurately determined with relative to the reference station 110 and/or base station 105.

Figure 2:
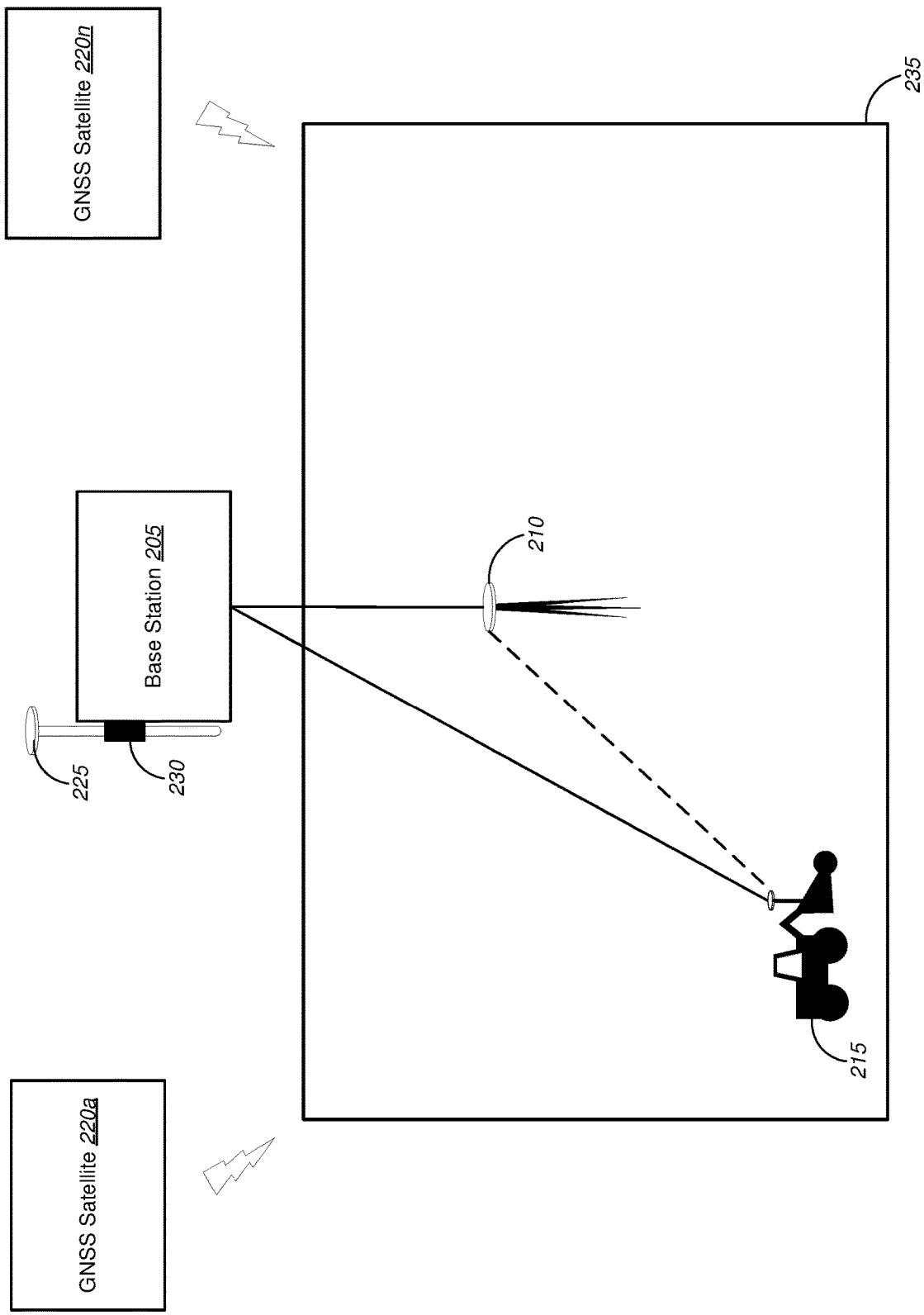
FIG. 2 is a schematic diagram of one arrangement of the system for improved vertical accuracy in RTK reference stations, in accordance with various embodiments.

An example field deployment of a base station 105, single reference station 110, and a dynamic rover 115 is shown in FIG. 2. FIG. 2 is a schematic diagram of one arrangement of a system 200 for improved vertical accuracy in RTK reference stations, in accordance with various embodiments. The system 200 includes base station 205, reference station 210, dynamic rover 215, one or more GNSS satellites 220a-220n, GNSS antenna 225, and vertical actuator 230. It should be noted that the various components of the system 200 are schematically illustrated in FIG. 2, and that modifications to the system 200 may be possible in accordance with various embodiments.

In various embodiments, the base station 205 may be coupled to the reference station 210, and dynamic rover 215. The base station 205 may further be in communication with the one or more GNSS satellites 220a-220n. The base station 205 may further include GNSS antenna 225 and vertical actuator 230. The GNSS antenna 225 may be coupled to the vertical actuator 230. The reference station 210 may similarly be in communication with the one or more GNSS satellites 220a-220n. The reference station 210 may further be coupled to the dynamic rover 215. The dynamic rover 215 may similarly be in communication with the one or more GNSS satellites 220a-220n.

In various embodiments, the reference station 210 may be deployed at site 235. The site 235 may include, for example, a field or other plot of land for grading and/or levelling operations. In some embodiments, grading and/or levelling may be performed by the dynamic rover 215, which may include, for example, a GNSS antenna and GNSS receiver coupled to a scraper, leveler, or tractor. As previously described, in various embodiments, the base station 205 may be a GNSS base station in communication with one or more GNSS satellites 220a-220n. The base station 205 includes a GNSS receiver and GNSS antenna 225 in communication with a constellation of the one or more GNSS satellites 220a-220n. The base station 205 may further include a vertical actuator 230 coupled to the GNSS antenna 225. The base station 205 may be configured to adjust the height (e.g., vertical position) of the GNSS antenna 225 as previously described, based on a vertical error of the reference station 210.

As the dynamic rover 215 moves around the site 235, the distance between the dynamic rover 215 and the reference station 210 and base station 205 may change. Accordingly, in some embodiments, the base station 205 may be configured to adjust the height of the GNSS antenna 225, via the vertical actuator 230, based on a vertical error determined at the reference station 210. The base station 205 may then be configured to transmit correction data to the dynamic rover 215, based on the adjusted height of the GNSS antenna 225.

As previously described, in various embodiments, the base station 205 may be configured to monitor vertical error determined to be present in the vertical position reported by the reference station 210. For example, in various embodiments, the vertical error may represent the difference in vertical position (e.g., the distance corrected) between an RTK-corrected vertical position and the uncorrected vertical position reported by the reference station 210. The base station 205 may further be configured to adjust the height of the GNSS antenna 225 of the base station 205. Accordingly, the base station 205 may include a vertical actuator 230, coupled to the GNSS antenna 225, and a controller configured to cause the vertical actuator 230 to raise or lower the height of the GNSS antenna 225. Suitable vertical actuators 230 may include, without limitation, various linear actuators and motors, electric motors, hydraulic motors and pumps, pneumatic pumps, and the like.

By adjusting the height of the GNSS antenna 225 of the base station 205, the vertical error may undergo a change equal (but opposite in magnitude) change as previously described. Accordingly, in various embodiments, the height of the GNSS antenna 225 may be adjusted from a starting position of the GNSS antenna 225 to halve the vertical error at the reference station 210. In other words, the height of the GNSS antenna of the base station 205 may be adjusted to produce an equal, but opposite vertical error at the base station 205 and the reference station 210, as determined relative to a starting vertical position of the GNSS antenna 225 before any adjustment has occurred.

In some further embodiments, the base station 205 may be configured to utilize other algorithms. As previously described, in some embodiments, the height of the GNSS antenna 225 of the base station 205 may be adjusted according to a weighting algorithm. In one example, the height of the GNSS antenna 225 of the base station 205 may be adjusted as a function of the proximity of the dynamic rover 215 to the reference station 210. The correction data provided by the base station 205 may change according to the height of the GNSS antenna 225 of the base station 205, as a function of the proximity of the distance from the dynamic rover 215 to the reference station 210.

Thus, in various embodiments, the dynamic rover 215 may be configured to perform vertical position correction based on the correction data of the base station 205. In various embodiments, the dynamic rover 215 may determine its own vertical position, such as the vertical position of a respective GNSS antenna of the dynamic rover 215, utilizing conventional GNSS positioning techniques. The dynamic rover 215 may be configured to perform vertical position correction using correction data from the base station 205, to correct for a vertical error at the dynamic rover 215. For example, the dynamic rover 215 may add or subtract a respective vertical error, seen at the dynamic rover 215, from the measured vertical position to produce a corrected vertical position of the dynamic rover 215. In other words: Corrected Vertical Position=Measured Vertical Position−Vertical Error. As previously described, vertical position correction decreases variability caused, for example, by short-term differences in the troposphere and/or ionosphere between the location of the base station 205 and the reference station 210. Accordingly, by adjusting the vertical error at the reference station 210, variability introduced by atmospheric conditions (e.g., short-term differences in the troposphere and/or ionosphere) in proximity to the reference station 210 may be reduced.

For example, as previously described, in various embodiments, the height (vertical position) of the GNSS antenna 225 of the base station 205 may be adjusted to effect a change in the vertical error seen at the reference station 210. The GNSS antenna 225 of the base station 205 may begin at a starting vertical position relative, from which conventional vertical error corrections are typically performed. A vertical error may, thus, be determined based on the phase of the carrier wave seen at the base station 205 from the starting vertical position of the GNSS antenna 225.

In some embodiments, the base station 205 may then be configured to adjust the vertical position of the GNSS antenna 225, via the vertical actuator 230, to a modified vertical position where the vertical error seen at the reference station 210 is halved in magnitude. Described another way, the base station 205 may be configured to adjust the vertical position of the GNSS antenna 225 to the modified vertical position wherein a vertical error at the reference station 210, as determined based on the modified vertical position of the GNSS antenna 225, is equal to but opposite to a vertical error that would be determined at the base station 205 for the GNSS antenna 225 at the modified vertical position relative to the starting vertical position. Thus, the vertical error that would be seen at the base station 205 is a determined as the vertical error that would be present for the GNSS antenna 225 at the modified vertical position relative to the carrier wave phase that would be seen by the GNSS antenna 225 at the starting vertical position. Thus, the vertical position of the GNSS antenna 225 may be adjusted as a function of the vertical error at the reference station 210. By reducing the vertical error as described, the variability introduced by atmospheric effects at the dynamic rover 215 may be reduced over a greater range of distances around the reference station 210, and especially when the dynamic rover 215 is in a position between the base station 205 and reference station 210. Thus, in some embodiments, the base station 205 may transmit correction data to the dynamic rover 215, based on the modified vertical position of the GNSS antenna 225. In other embodiments, the reference station 210 may be configured to transmit correction data to the dynamic rover 215, based on the corrected vertical position of the reference station 210 (as corrected based on correction data from the base station 205).

In some further embodiments, the base station 205 may be configured to adjust the vertical position of the GNSS antenna 225, via the vertical actuator 230, to a modified vertical position based on a function of the distance between the dynamic rover 215 and the reference station 210 and/or base station 205, and the respective vertical error seen at the reference station 210 and/or base station 205. For example, in some embodiments, a scaling factor may be determined according to the following equation:

$$\text{Scaling Factor} = \text{Distance}_{DRtoBS}/(\text{Distance}_{DRtoBS} + \text{Distance}_{DRtoRS}) \quad (1)$$

where $\text{Distance}_{DRtoBS}$ is the distance between the dynamic rover 215 and the base station 205, and $\text{Distance}_{DRtoRS}$ is the distance between the dynamic rover 215 and the reference station 210.

Accordingly, in some embodiments, the scaling factor may be used to determine an adjustment to be made to the vertical position of the GNSS antenna 225. For example, the vertical position of the GNSS antenna 225 may be adjusted to produce a modified vertical error at the reference station 210, which gradually approaches 0 vertical error as the dynamic rover 215 approaches the position of the reference station 210. For example, the vertical position of the GNSS antenna 225 may be adjusted according to the scaling factor, as given by the following equation:

$$MVP_{BS} = SVP_{BS} - \text{Vertical Error}_{RS} * (\text{Scaling Factor}) \quad (2)$$

Where $MVP_{BS}$ is the modified vertical position of the base station 205 GNSS antenna 225, $SVP_{BS}$ is the starting vertical position of the base station 205 GNSS antenna 225, and Vertical $\text{Error}_{RS}$ is the vertical error at the reference station 210 as determined relative to the carrier wave phase seen by the GNSS antenna 225 of the base station 205 at the starting vertical position.

Accordingly, modification of the vertical position of the GNSS antenna 225 of the base station 205 may result in a modified vertical error at the reference station 210, as given by the following equation:

$$\text{Modified Vertical Error}_{RS} = \text{Vertical Error}_{RS} * (1 - \text{Scaling Factor}) \quad (3)$$

Where Modified Vertical Error$_{RS}$ is the vertical error at the reference station 210 as determined relative to the modified vertical position of the base station 205 GNSS antenna 225.

Accordingly, in various embodiments, the dynamic rover 215 may be configured to perform vertical position corrections based on correction data transmitted by the base station 205 and/or the reference station 210, wherein the correction data is based on the modified vertical position of the GNSS antenna 225, or alternatively, the modified vertical error at the reference station 210. Thus, it will be appreciated that the correction data may be weighed according to the scaling factor as described above, wherein the vertical position of the GNSS antenna 225 (e.g., vertical error at the reference station) is controlled according to a relative proximity of the dynamic rover 215 to the base station 205 and reference station 210. It is to be appreciated that in other examples, different scaling factors may be utilized. For example, a scaling factor may be determined as a function of absolute distance of the dynamic rover 215 to the reference station 210 relative to a maximum threshold distance, distance of the dynamic rover 215 to the base station 205 relative to the maximum threshold distance. In yet further embodiments, instead of a scaling factor that changes continuously, one or more discrete steps may be associated with one or more threshold ranges of distances around the reference station. For example, by way of explanation only, when the dynamic rover is within a circular area defining a region 0-100 m in distance around the reference station 210 (e.g., a radius of 10 m around the reference station 210), a discrete value of 0.75 may be used for the scaling factor; for the ring defined by the range of distances between 100-200 m around the reference station 210, a scaling factor of 0.5 may be used; and for the ring defined by the range of distances between 100-300 m around the reference station 210, the scaling factor may be a discrete value of 0.25.

In various embodiments, correction data, transmitted by the base station 205 and/or reference station 210, may include, without limitation, carrier wave phase information from the base station 205 at the modified vertical position of the GNSS antenna 225. Thus, the dynamic rover 215 and/or the reference station 210 may be configured to determine respective vertical error in its respective vertical position measurements based on the correction data. In some embodiments, correction data may include the determined respective vertical error by which to adjust a measured vertical position. For example, the reference station 210 may transmit a correction data indicating a modified vertical error of +1 inches. Accordingly, the dynamic rover may correct its measured vertical position by decreasing the measured vertical position by the amount of the modified vertical error. In this example, the modified vertical error is determined already as a function of the relative position of the dynamic rover 215, as previously described. Accordingly, vertical position measurements may be corrected to more accurately reflect the atmospheric conditions at the dynamic rover 215, based on its relative proximity to the reference station 210 and/or base station 205.

In some further embodiments, the reference station 210 and/or dynamic rover 215 may be configured to perform vertical position corrections as described above in addition and/or in combination with other position correction techniques. For example, in some embodiments, the dynamic rover 215 may determine its vertical position utilizing differential GPS (DGPS) techniques, as known to those in the art, and apply vertical position corrections to the determined vertical position as described above. Thus, base station 205, reference station 210, and dynamic rover 215 may, in some embodiments, be configured to perform the vertical position correction techniques described above in addition to or in combination with various other correction techniques.

Figure 3:
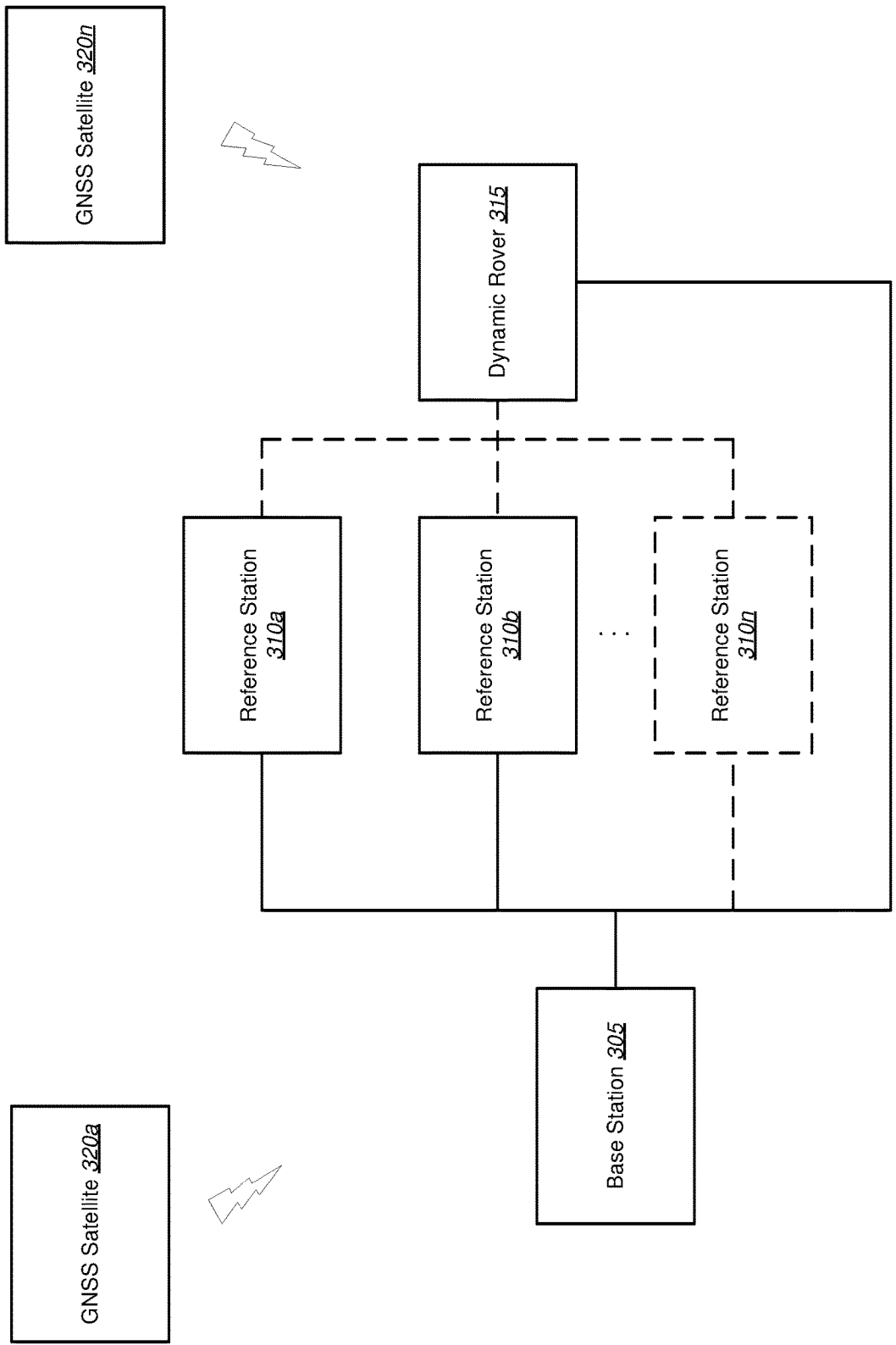
FIG. 3 is a schematic block diagram of an alternative configuration for a system for improved vertical accuracy in RTK reference stations, in accordance with various embodiments.

FIG. 3 is a schematic diagram of an alternative arrangement for a system 300 for improved vertical accuracy in RTK reference stations, in accordance with various embodiments. The system 300 includes a base station 305, two or more reference stations 310a-310n (collectively referred to as the reference stations 310), dynamic rover 315, and one or more GNSS satellites 320a-320n (collectively referred to as the GNSS satellites 320). It should be noted that the various components of the system 300 are schematically illustrated in FIG. 3, and that modifications to the system 300 may be possible in accordance with various embodiments.

In various embodiments, in contrast with the system 100 of FIG. 1, the system 300 may include multiple reference stations 310. The base station 305 may be coupled to the one or more reference stations 310a-310n, and dynamic rover 315. The base station 305 may further be in communication with the one or more GNSS satellites 320a-320n. The reference station 310 may similarly be in communication with the one or more GNSS satellites 320a-320n. The reference station 310 may, in some example, further be coupled to the dynamic rover 315. The dynamic rover 315 may similarly be coupled to the one or more GNSS satellites 320a-320n.

As previously described, the base station 305 may be a GNSS base station in communication with the one or more GNSS satellites 320a-320n. The base station 305 may be configured to receive position data from the one or more GNSS satellites 320a-320n to determine the base station's 305 geospatial position. It is to be understood that the base station 305 is not limited to any particular GNSS system, and may utilize various types of GNSS systems including, without limitation, the Global Positioning System (GPS), Global Navigation Satellite System (GLONASS), Galileo, BeiDou Navigation Satellite System (BDS), or any other suitable GNSS systems.

The base station 305 may further be configured to generate correction data and transmit the correction data to the two or more reference stations 310a-310b, and/or dynamic rover 315. For example, as previously described, the base station 305 may include a wireless transceiver configured to communicate with the reference stations 310 and dynamic rover 315. In various embodiments, the wireless transceiver may include, without limitation, a modem, radio, a wireless network card, an infrared transceiver, or other wireless communication device and/or chipset (such as a Bluetooth™ transceiver, an 802.11 transceiver, a WiFi device, a WiMax device, a WWAN device, a Z-Wave device, a ZigBee device, cellular communication facilities, etc.), and/or a low-power wireless device (such as a LoRaWAN or LPWAN device), in communication with a corresponding wireless transceiver of the reference stations 310 and/or dynamic rover 315.

In various embodiments, the base station 305 may be configured to generate correction data based on a carrier wave phase of a signal received from at least one of the one or more GNSS satellites 320a-320n. As previously described, for example, the base station 305 may be configured to provide RTK corrections based on the phase of the carrier signal received by the base station 305. Thus, the base station 305 may be configured to transmit a phase of the carrier wave signal received by the base station 305, where the carrier wave signal is a carrier wave signal also received by the two or more reference stations 310a-310n, and also the dynamic rover 315. Accordingly, the carrier wave signal may be transmitted by a GNSS satellite 320a-320n in view of each of the base station 305, the reference stations 310, and dynamic rover 315.

As previously described, the base station 305 may include a vertical actuator configured to adjust the height of the GNSS antenna of the base station 305. Accordingly, the base station 105 may include a vertical actuator, coupled to the GNSS antenna, and a controller configured to cause the vertical actuator to raise or lower the height of the GNSS antenna as described below.

For example, adjustments to the vertical position of the GNSS antenna of the base station 305 are reflected in the vertical error determination at each of the reference stations 310a-310n. For example, an adjustment to the vertical position of the GNSS antenna would result in a an equal, but opposite change in the vertical error. Adjustments to the vertical position of the GNSS antenna cause a change in the carrier wave phase at the GNSS antenna. Thus, a change in the height (e.g., vertical position) of GNSS antenna will concurrently cause a change in the vertical error determined by the reference stations 310.

In some embodiments, the vertical position of the GNSS antenna may be changed from a starting vertical position of the GNSS antenna to a modified vertical position, where the modified vertical position is determined based on a representative value for the vertical error at each of the two or more reference stations 310a-310n. For example, in some embodiments, the representative value may include, without limitation, a mean or median vertical error taken from the two or more reference stations 310a-310n, or a rolling average of vertical errors at one or more of the two or more reference stations 310a-310n.

The base station 305 may, in turn, be configured to adjust the vertical position of the GNSS antenna to halve the representative value for the vertical error (e.g., the mean or median value, the rolling average, etc.) from the representative value for the respective vertical errors determined relative to the starting vertical position of the GNSS antenna. Described another way, the base station 305 may be configured to adjust the vertical position of the GNSS antenna to the modified vertical position where the representative value for the vertical errors (e.g., the mean or median vertical error, the rolling average, etc.) at the reference stations 310, as determined based on the modified vertical position of the GNSS antenna, is equal to but opposite the vertical error that would be seen at the base station 305 for the GNSS antenna at the modified vertical position relative to the starting vertical position. Thus, the vertical error that would be seen at the base station 305 is a vertical error that would be present for the GNSS antenna at the modified vertical position relative to the carrier wave phase that would be seen by the GNSS antenna of the base station 305 at the starting vertical position.

For example, in some embodiments, the representative value may be the mean vertical error between the two or more reference stations 310a-310n. In this example, a mean vertical error may be determined to be +1 inches across the reference stations 310 (e.g., the mean for RTK-corrected vertical positions is 1 inch higher than the uncorrected position), the base station 305 may be configured to lower the height of the GNSS antenna by −½ inch (to halve the reported vertical error). Similarly, if the mean vertical error is determined to be −1 inch, the base station may raise the height of the GNSS antenna by +½ inch. Thus, the base station 305 may be configured to adjust the vertical position of the GNSS antenna such that a mean vertical error at the reference stations 310, determined relative to a starting vertical position of the GNSS antenna before any adjustments have been made, is halved by making an adjustment to the vertical position of the GNSS antenna, from the starting vertical position of the GNSS antenna, that is equal to half of the vertical error at the reference station, but in the opposite direction.

In some embodiments, the base station 105 may be configured to adjust the height of the GNSS antenna substantially in real-time, minus processing and transmission delays, and the time to physically actuate the GNSS antenna (e.g., the speed of the linear actuator). Alternatively, the base station 305 may be configured to perform vertical position adjustments of the GNSS antenna periodically, for example, at a given polling rate. In yet further embodiments, the height of the GNSS antenna may be adjusted upon request by a user at the base station 305, or via request from any of the two or more reference stations 310a-310n and/or dynamic rover 315.

In further embodiments, the base station 305 may be configured to adjust the vertical position of the GNSS antenna to a modified vertical position, where the modified vertical position is determined based on the relative locations of the two or more reference stations 310a-310n, dynamic rover 315, and base station 305. Accordingly, in some embodiments, a weighting algorithm may be used to adjust the height of the GNSS antenna. For example, the height of the GNSS antenna may be adjusted as a function of the proximity of the dynamic rover 315 to each of the two or more reference stations 310a-310n, respectively. For example, in some embodiments, the base station 305 may further be configured to adjust the height of the GNSS antenna to produce less vertical error (e.g., 0 vertical error) at the respective reference station 310a-310n closest to the dynamic rover 315. For example, as the dynamic rover 315 approaches reference station 310a, the base station 305 may be configured to adjust the vertical position of the GNSS antenna to produce a vertical error that approaches zero. Conversely, as the dynamic rover 315 moves further away from reference station 310a, the height of the GNSS base station antenna may be adjusted according to a weighted representative value of the vertical error across each of the two or more reference stations 310a-310n. In one example, the vertical position of the GNSS antenna of the base station 305 may be adjusted according to a weighting based on relative distances of the respective reference stations 310a-310n to the dynamic rover 315.

Accordingly, as the dynamic rover 315 moves away from a respective reference station 310a-310n, the height of the GNSS antenna may be adjusted to allow the vertical error at the respective reference station 310a-310n to increase as the vertical error is decreased at another respective reference station 310a-310n of the two or more reference stations 310a-310n as the dynamic rover 315 approaches closer to the other respective reference station 310a-310n. For example, when the dynamic rover 315 overlaps with a first reference station 310a, the height (e.g., vertical position) of the GNSS antenna of the base station 305 may be at a modified vertical position where vertical error at the first reference station is equal to 0. In contrast, vertical error at a second reference station 310*b* may similarly be modified by the change in the vertical position of the GNSS antenna of the reference station 305. As the dynamic rover 315 moves away from the first reference station 310*a* and approaches the second reference station 310*b*, the base station 305 may be configured to adjust the vertical position of the GNSS antenna to reduce the respective vertical error at the second reference station 310*b*. Similar adjustments may be made for additional reference stations 310 based on the respective distances to each of the two or more reference stations 310*a*-310*n* from the dynamic rover 315. This will be discussed in greater detail with respect to FIG. 4 below.

The correction data provided by the base station 305 may, accordingly, be dynamically changing according to the height of the GNSS antenna of the base station 305 and based on the relative distance of the dynamic rover to each respective reference station 310*a*-310*n*. Thus, the dynamic rover 315 may be configured to perform vertical position correction based on correction data that changes dynamically according to the relative position of the dynamic rover 315. As described above, an advantage of reducing the vertical error at a respective reference station 310*a*-310*n* is that the vertical position of the dynamic rover 315 is improved as the dynamic rover 315 moves into closer proximity to a respective reference station 310*a*-310*n*.

Figure 4:
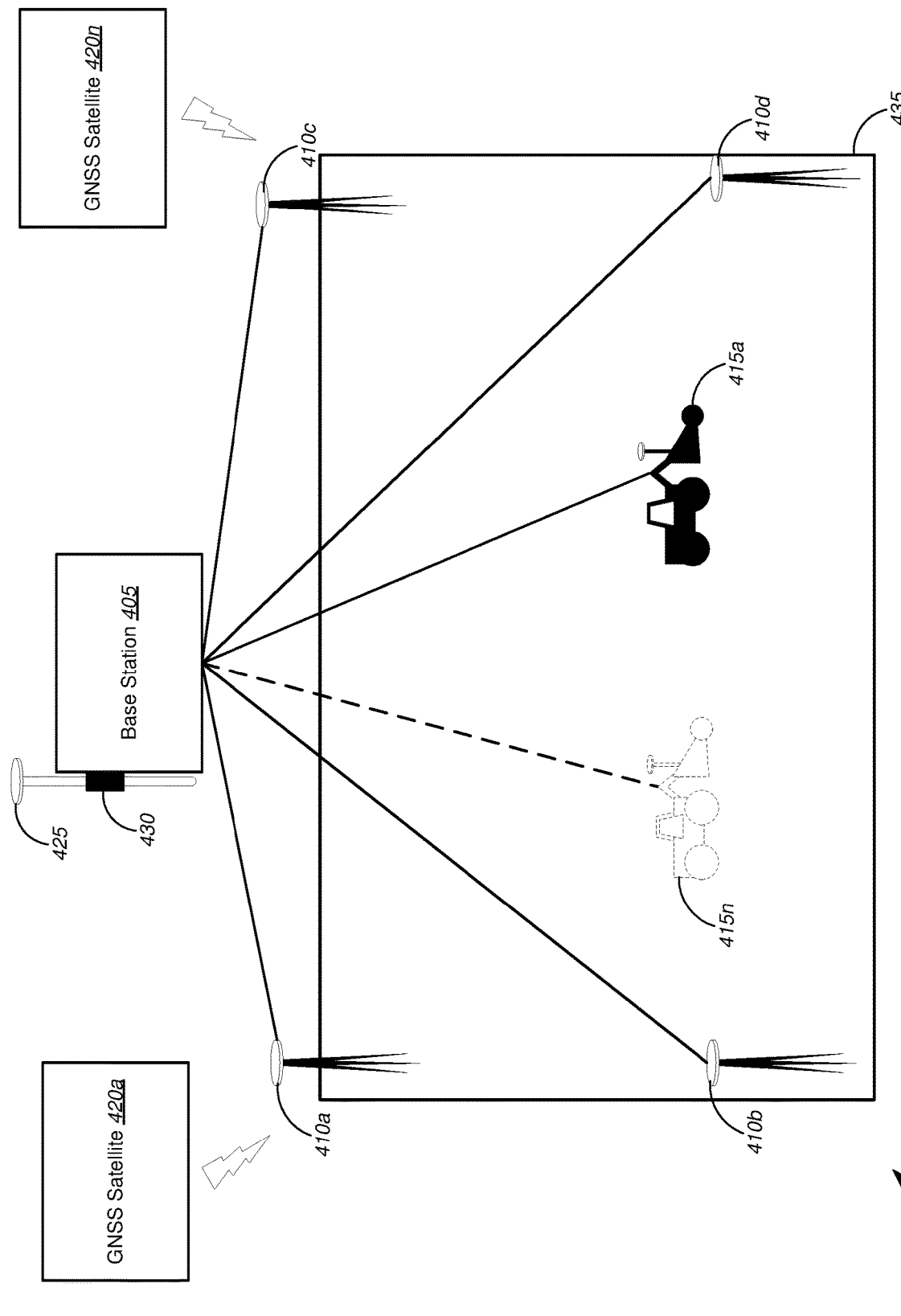
FIG. 4 is a schematic diagram of an example arrangement of the alternative configuration for the system for improved vertical accuracy in RTK reference stations, in accordance with various embodiments.

An example field deployment of a base station 305, two or more reference stations 310*a*-310*n*, and a dynamic rover 315 is shown in FIG. 4. FIG. 4 is a schematic diagram of an arrangement for a system 400 for improved vertical accuracy in RTK reference stations, in accordance with various embodiments. The system 400 includes a base station 405, a first reference station 410*a*, a second reference station 410*b*, a third reference station 410*c*, a fourth reference station 410*d*, collectively referred to as the reference stations 410, a first dynamic rover 415*a*, an nth dynamic rover 415*n*, one or more GNSS satellites 420*a*-420*n*, GNSS antenna 425, and vertical actuator 430. It should be noted that the various components of the system 400 are schematically illustrated in FIG. 4, and that modifications to the system 400 may be possible in accordance with various embodiments.

In various embodiments, the base station 405 may be coupled to the each of the reference stations 410, and first dynamic rover 415. The base station 405 may further be in communication with the one or more GNSS satellites 420*a*-420*n*. The base station 405 may further include GNSS antenna 425 and vertical actuator 430. The GNSS antenna 425 may be coupled to the vertical actuator 430. The reference station 410 may similarly be in communication with the one or more GNSS satellites 420*a*-420*n*. The reference station 410 may further be coupled to the first dynamic rover 415. The first dynamic rover 415 may similarly be in communication with the one or more GNSS satellites 420*a*-420*n*. It is to be appreciated that although four reference stations 410*a*-410*d* are depicted by way of example only, in other embodiments, more or less reference stations may be deployed in on the site 435. For example, in other embodiments, reference stations 410 may be deployed by distance (e.g., a reference station every 100 m, 50 m, etc.), around the perimeter of the site 435, or interspersed within the site 435.

In various embodiments, the reference stations 410 may be deployed at site 435. The site 435 may include, for example, a field or other plot of land for grading and/or levelling operations. In some embodiments, grading and/or levelling may be performed by the first dynamic rover 415*a*, which may include, for example, a GNSS antenna and GNSS receiver coupled to a scraper, leveler, or tractor. As previously described, in various embodiments, the base station 405 may be a GNSS base station in communication with one or more GNSS satellites 420*a*-420*n*. The base station 405 includes a GNSS receiver and GNSS antenna 425 in communication with a constellation of the one or more GNSS satellites 420*a*-420*n*. The base station 405 may further include a vertical actuator 430 coupled to the GNSS antenna 425. The base station 405 may be configured to adjust the height (e.g., vertical position) of the GNSS antenna 425 as previously described, based on a vertical error of the reference station 410.

As the first dynamic rover 415*a* moves around the site 435, the distance between the first dynamic rover 415*a* and each of the respective reference stations 410*a*-410*d*, and base station 405 may change. Accordingly, in some embodiments, the base station 405 may be configured to adjust the height of the GNSS antenna 425, via the vertical actuator 430, based on a vertical error determined at each of the reference stations 410*a*-410*d*. The base station 405 may then be configured to transmit correction data to the first dynamic rover 415*a*, based on the adjusted height of the GNSS antenna 425.

As previously described, in various embodiments, the base station 405 may be configured to monitor vertical error determined to be present in the vertical position reported by each of the reference stations 410*a*-410*d*. For example, in various embodiments, the vertical error may represent the difference in vertical position (e.g., the distance corrected) between an RTK-corrected vertical position and the uncorrected vertical position at a respective reference station 410*a*-410*d*. The base station 405 may further be configured to adjust the height of the GNSS antenna 425 of the base station 405. Accordingly, the base station 405 may include a vertical actuator 430, coupled to the GNSS antenna 425, and a controller configured to cause the vertical actuator 430 to raise or lower the height of the GNSS antenna 425. Suitable vertical actuators 430 may include, without limitation, various linear actuators and motors, electric motors, hydraulic motors and pumps, pneumatic pumps, and the like.

By adjusting the height of the GNSS antenna 425 of the base station 405, the vertical error at each of the respective reference stations 410*a*-410*d* may undergo a change equal (but opposite in magnitude) as previously described. Accordingly, as previously described, in various embodiments, the height (e.g., vertical position) of the GNSS antenna 425 may be adjusted from a starting position of the GNSS antenna 425 to halve the representative value (e.g., the mean, median, rolling average, etc.) of the vertical error across the reference stations 410. In other words, the height of the GNSS antenna 425 of the base station 405 may be adjusted to produce an equal, but opposite vertical error at the base station 405 to the representative value of the vertical error, wherein the vertical error at the base station 405 at the modified vertical position of the GNSS antenna 425 is determined relative to a starting vertical position of the GNSS antenna 425 before any adjustment has occurred.

In some further embodiments, the base station 405 may be configured to utilize other algorithms to adjust the height of the GNSS antenna 425. As previously described, in some embodiments, the height of the GNSS antenna 425 of the base station 405 may be adjusted according to a weighting algorithm. In one example, the height of the GNSS antenna 425 of the base station 405 may be adjusted as a function of the proximity of the first dynamic rover 415*a* to the reference station 410. The correction data provided by the base station 405 may change according to the height of the GNSS antenna 425 of the base station 405, which in turn is controlled as a function of the proximity of the distance from the first dynamic rover 415a to each respective reference station 410a-410d.

In some embodiments, the base station 405 may be configured to adjust the vertical position of the GNSS antenna 425, via the vertical actuator 430, to a modified vertical position based on a function of the distance between the first dynamic rover 415a and each of the reference stations 410a-410d and/or base station 405, and the respective vertical error seen at each of the reference stations 410a-410d and/or base station 405. For example, in some embodiments, a scaling factor may be utilized to weight a respective vertical error at each of the respective reference stations 410a-410d. When the first dynamic rover 415a approaches the first reference station 410a, the vertical error at the first reference station 410a may be weighted such that a representative value (e.g., a mean (including a weighted mean), median, rolling average, etc.) for the vertical error approaches the vertical error at the first reference station 410. Conversely, as the first dynamic rover 415a moves away from each of the second reference station 410b, third reference station 410c, and fourth reference station 410d, the vertical errors at the respective reference stations 410b-410d may be weighted to decrease in effect (eventually reaching 0 when the distance to the first reference station 410a reaches 0). When the first dynamic rover 415a is positioned between each of the reference stations 410a-410d, the representative value of the vertical error may be weighted based on the vertical error at each of the respective reference stations 410a-410d according to the distance of the first dynamic rover 415a from each of the respective reference stations 410a-410d. Thus, closer reference stations 410 may be weighted more heavily than farther reference stations 410.

Accordingly, the vertical position of the GNSS antenna 425 may be modified based on the representative value of the vertical error for the reference stations 410. In one embodiment, the vertical position of the GNSS antenna 425 may be adjusted to a modified vertical position, where at the modified vertical position the representative value of the vertical error is completely offset (e.g., 0 vertical error at the representative value for the vertical error). For example, if the representative value of the vertical error across all reference stations 410 is a +1 inch vertical error, the vertical position of the GNSS antenna 425 may be lowered by −1 inch to cause the representative value of the vertical error to be zero when determined relative to the modified vertical position of the GNSS antenna 425. In other embodiments, as previously described, the base station 405 may be configured to adjust the vertical position of the GNSS antenna 425 to a modified vertical position, where at the modified vertical position the representative value as determined from the modified vertical position is half of the representative value at a starting vertical position.

Accordingly, in various embodiments, the first dynamic rover 415a may be configured to perform vertical position corrections based on correction data transmitted by the base station 405 and/or the reference stations 410, wherein the correction data is based on the modified vertical position of the GNSS antenna 425, or alternatively, the modified vertical error at the reference station 410. Thus, it will be appreciated that the correction data may be weighed according to a relative proximity of the first dynamic rover 415a to a respective reference station 410a-410d. It is to be appreciated that in other examples, different scaling factors may be utilized. For example, a scaling factor may be determined as a function of absolute position of the first dynamic rover 415a relative to the site 435. For example, when the first dynamic rover 415a is at a first position, each respective vertical error from a corresponding reference station 410a-410d may be weighted by a discrete scaling factor, from which a representative value for the vertical errors may be determined. For example, when discrete ranges of distances may correspond to a discrete scaling factor (e.g., weighting) to be applied to the vertical error of the respective reference station 410. For example, for a circular area defining the range of distances between 0-100 m around a given reference station 410a-410d, a first scaling factor may be used. For a ring defined by the range of distances between 100-200 m around the given reference station 410a-410d, a second scaling factor may be used, and so on and so forth. The accordingly, for any given position on the site 435, a respective scaling factor may be used to weight the vertical error at each respective reference station 410a-410d.

In yet further embodiments, the techniques described above may be applied to multiple dynamic rovers 415a-415n. For example, in various embodiments, each of the multiple dynamic rovers 415a-415n may comprise a respective vertical actuator coupled to each of respective GNSS antenna of the dynamic rovers 415a-415n. Accordingly, a similar weighting scheme may be applied to each respective dynamic rover 415a-415n, based on the respective positions of the respective dynamic rovers 415a-415n relative to each of the reference stations 410a-410d. Adjustments to the vertical position of the GNSS antenna may be made at a respective GNSS antenna of the dynamic rovers 415a-415n, as opposed to the GNSS antenna 425 of the base station 405. In these examples, the vertical position of the GNSS antenna of a respective dynamic rover 415a-415n may be modified as described above. Instead of modifying the vertical position of GNSS antenna 425 of the base station 405, the dynamic rovers 415a-415n may be configured to modify a vertical position (e.g., to offset the representative value of each of the vertical errors to produce zero vertical error at the respective dynamic rover 415a-415n; to reduce the representative value of the vertical error by half; or any other vertical position modification as previously described) of the respective GNSS antennas based on a representative value for the vertical error at each of the reference stations 410a-410d, that is based on each dynamic rover's 415a-415n own respective position on the site 435. Accordingly, corrections transmitted from the base station 405 may result in a correction corresponding to the respective position of each of the dynamic rovers 415a-415n. In some embodiments, the base station 405 may be configured to determine and transmit the representative value as previously described. In other embodiments, the dynamic rover 415a-415n may be configured to determine the representative value for their respective positions based on a reported vertical error from each of the respective reference stations 410a-410d.

Figure 5:
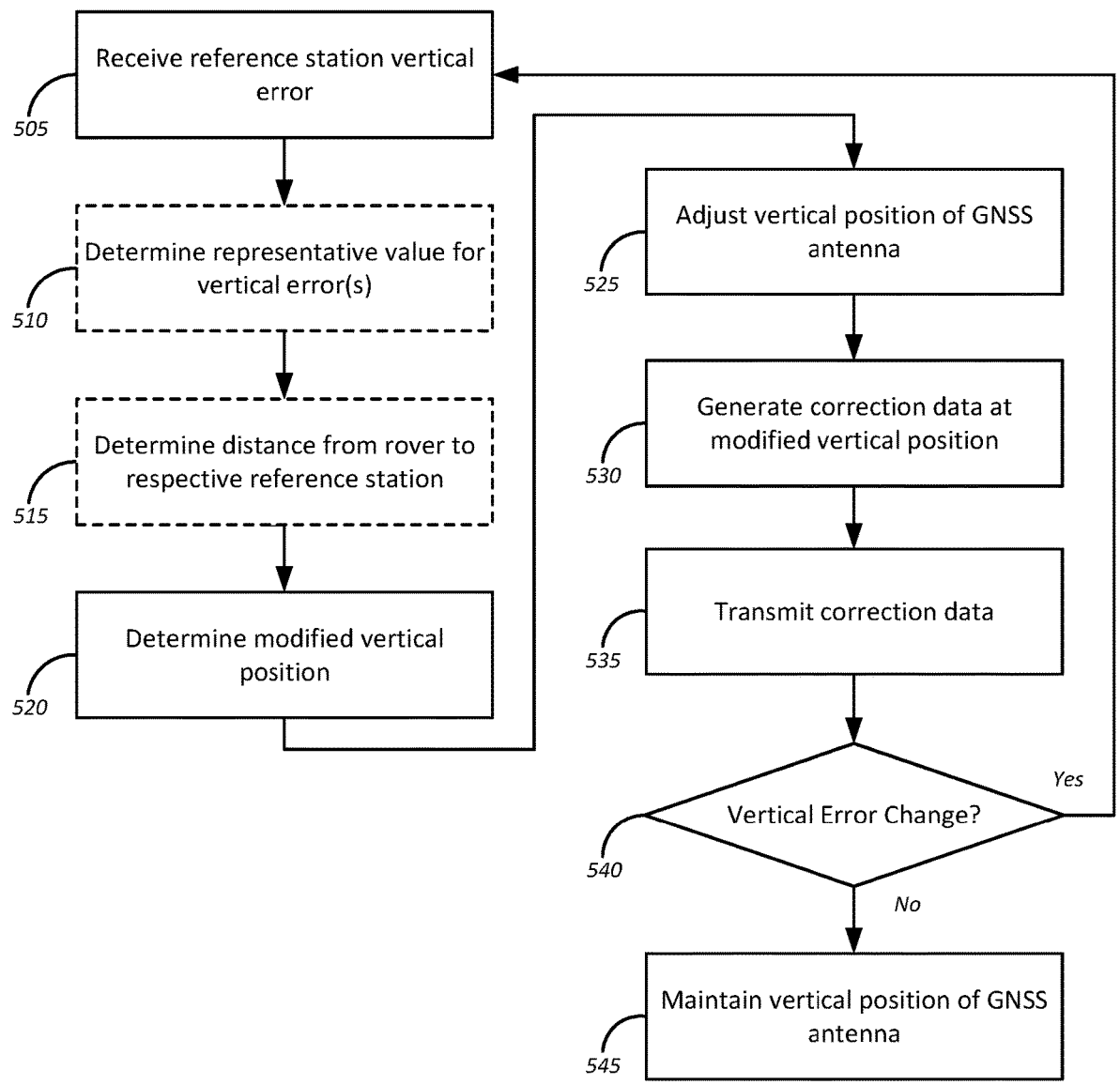
FIG. 5 is a flow diagram of a method for improved vertical accuracy in RTK reference stations, in accordance with various embodiments.

FIG. 5 is a flow diagram of a method 500 for improved vertical accuracy in RTK reference stations, in accordance with various embodiments. The method 500 begins, at block 505, by receiving a first vertical error from a first reference station. In various embodiments, the first vertical error may correspond to a starting vertical position of the GNSS antenna of the base station.

The method 500 may continue, at optional block 510, by determining a representative value for the vertical error at one or more reference stations. As previously described, in some embodiments, a representative value may include one of a mean (including a weighted mean), median, rolling average, or other statistical representation of the vertical error across one or more reference stations. In some embodiments, the representative value may be based on a position of the GNSS rover relative to each of the respective reference stations. Accordingly, at optional block 515, the method 500 may include determining a distance from the GNSS rover to a respective reference station. Accordingly, as previously described, in some embodiments, the base station may be configured determine the representative value as a function of the distance of the rover to one or more respective reference stations.

The method 500 may continue, at block 520, by determining a modified vertical position. As previously described, in some embodiments, the modified vertical position may correspond to a height (e.g., vertical position) of the GNSS antenna at which the representative value of the vertical error across the reference stations is halved. In other embodiments, the modified vertical position may be determined as a function of the distance between the GNSS rover and each of one or more respective reference stations. At block 525, the method 500 continues by adjusting the vertical position of the GNSS antenna to the modified vertical position.

The method may further include, at block 530, generating correction data based on the modified vertical position of the GNSS antenna. As previously described, adjustments to the vertical position of the GNSS antenna results in concurrent changes to the vertical error at the one or more reference stations. Accordingly, correction data transmitted by the base station may also change concurrently with changes to the vertical position of the GNSS antenna. Accordingly, in some embodiments, correction data may include phase information for a carrier wave signal at the modified vertical position of the GNSS antenna and/or vertical error information at one or more respective reference stations. At block 535, the method 500 may continue by transmitting the correction data to the GNSS rover. In various embodiments, the base station may configured to transmit the correction data via a wireless communication device, such as a Bluetooth, cellular, Wi-Fi, radio frequency (RF), or other wireless transceiver.

At decision block 540, it is determined whether a change in vertical error has occurred. The determination of whether a change has occurred may happen periodically, in real-time, or upon demand. If a change in vertical error has occurred, the method 500 may return to block 505 to receive a vertical error from one or more reference stations. If no vertical error change has been detected, the method 545 may continue, at block 545, by maintaining the vertical position of the GNSS antenna.

Figure 6:
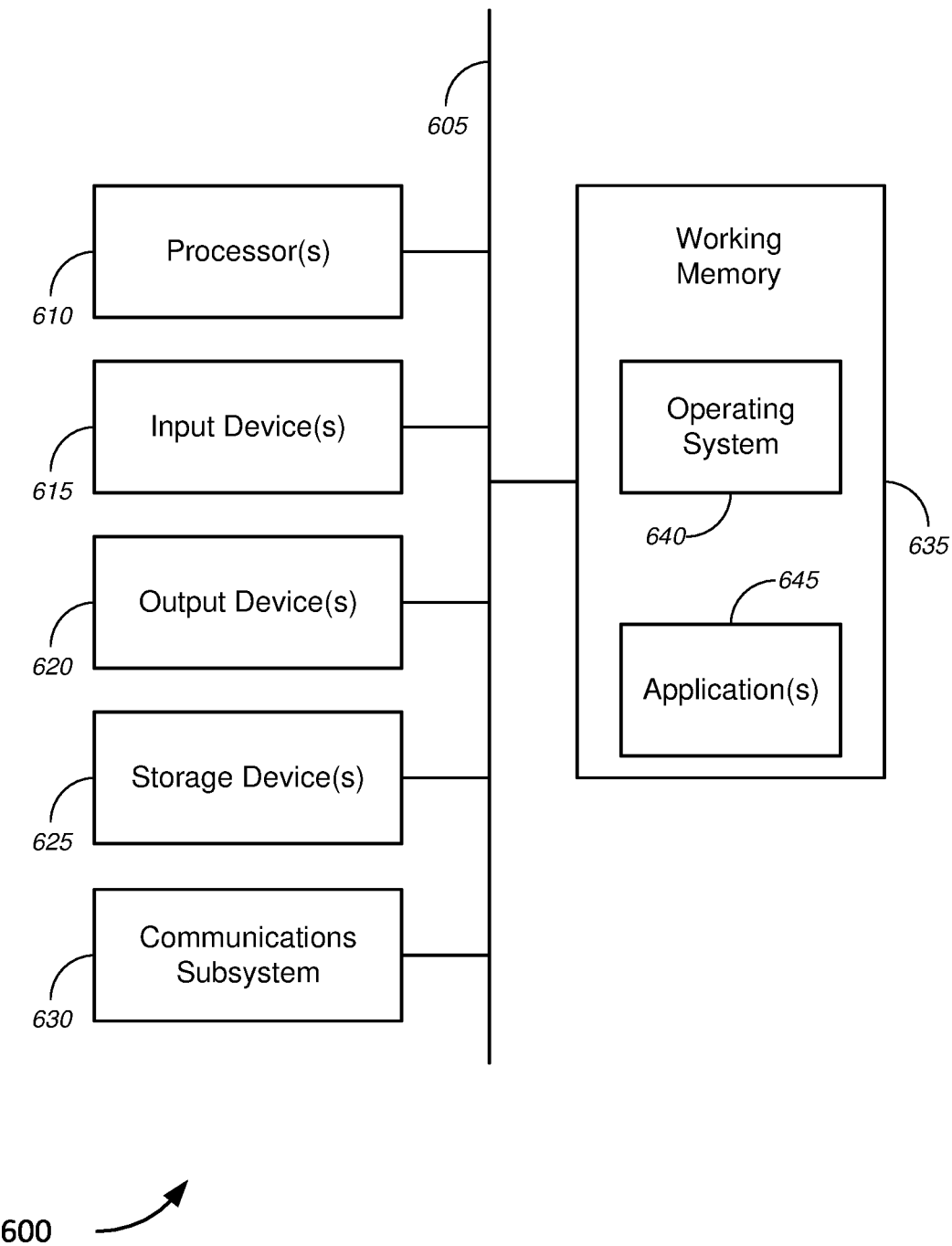
FIG. 6 is a schematic block diagram of a computer system for improved vertical accuracy RTK reference stations, in accordance with various embodiments.

FIG. 6 is a schematic block diagram of a computer system 600 for improved vertical accuracy RTK reference stations, in accordance with various embodiments. FIG. 6 provides a schematic illustration of one embodiment of a computer system 600 at one or more of a base station 405, one or more of the reference stations, and one or more dynamic rovers. In further embodiments, the computer system 600 may be a controller coupled to a GNSS antenna at one or more of a base station or dynamic rover as previously described. The computer system 600 may be configured to perform the methods provided by various embodiments as described herein. It should be noted that FIG. 6 only provides a generalized illustration of various components, of which one or more of each may be utilized as appropriate. FIG. 6, therefore, broadly illustrates how individual system elements may be implemented in a relatively separated or relatively more integrated manner.

The computer system 600 includes multiple hardware elements that may be electrically coupled via a bus 605 (or may otherwise be in communication, as appropriate). The hardware elements may include one or more processors 610, including, without limitation, one or more general-purpose processors and/or one or more special-purpose processors (such as microprocessors, digital signal processing chips, graphics acceleration processors, and microcontrollers); one or more input devices 615, which include, without limitation, a mouse, a keyboard, one or more sensors, and/or the like; and one or more output devices 620, which can include, without limitation, a display device, and/or the like.

The computer system 600 may further include (and/or be in communication with) one or more storage devices 625, which can comprise, without limitation, local and/or network accessible storage, and/or can include, without limitation, a disk drive, a drive array, an optical storage device, solid-state storage device such as a random-access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer system 600 might also include a communications subsystem 630, which may include, without limitation, a modem, a network card (wireless or wired), an IR communication device, a wireless communication device and/or chipset (such as a Bluetooth™ device, an 802.11 device, a WiFi device, a WiMax device, a WWAN device, a Z-Wave device, a ZigBee device, cellular communication facilities, etc.), and/or a low-power wireless device. The communications subsystem 630 may permit data to be exchanged with a network (such as the network described below, to name one example), with other computer or hardware systems, between data centers or different cloud platforms, and/or with any other devices described herein. In many embodiments, the computer system 600 further comprises a working memory 635, which can include a RAM or ROM device, as described above.

The computer system 600 also may comprise software elements, shown as being currently located within the working memory 635, including an operating system 640, device drivers, executable libraries, and/or other code, such as one or more application programs 645, which may comprise computer programs provided by various embodiments (including, without limitation, various applications running on the base station, one or more reference stations, one or more dynamic rovers, controllers on the base station and/or one or more dynamic rovers, and various other devices as described above), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 625 described above. In some cases, the storage medium might be incorporated within a computer system, such as the system 600. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer system 600 and/or might take the form of source and/or installable code, which, upon compilation and/or installation on the computer system 600 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, single board computers, field programmable gate arrays (FPGA), application specific integrated circuits (ASIC), and system on a chip (SoC), might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer system 600) to perform methods in accordance with various embodiments of the invention. According to a set of embodiments, some or all of the procedures of such methods are performed by the computer system 600 in response to processor 610 executing one or more sequences of one or more instructions (which might be incorporated into the operating system 640 and/or other code, such as an application program 645) contained in the working memory 635. Such instructions may be read into the working memory 635 from another computer readable medium, such as one or more of the storage device(s) 625. Merely by way of example, execution of the sequences of instructions contained in the working memory 635 might cause the processor(s) 610 to perform one or more procedures of the methods described herein.

The terms "machine readable medium" and "computer readable medium," as used herein, refer to any medium that participates in providing data that causes a machine to operate in a specific fashion. In an embodiment implemented using the computer system 600, various computer readable media might be involved in providing instructions/code to processor(s) 610 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like. Non-volatile media includes, for example, optical and/or magnetic disks, such as the storage device(s) 625. Volatile media includes, without limitation, dynamic memory, such as the working memory 635. In some alternative embodiments, a computer readable medium may take the form of transmission media, which includes, without limitation, coaxial cables, copper wire and fiber optics, including the wires that comprise the bus 605, as well as the various components of the communication subsystem 630 (and/or the media by which the communications subsystem 630 provides communication with other devices). In an alternative set of embodiments, transmission media can also take the form of waves (including, without limitation, radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 610 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 600. These signals, which might be in the form of electromagnetic signals, acoustic signals, optical signals, and/or the like, are all examples of carrier waves on which instructions can be encoded, in accordance with various embodiments of the invention.

The communications subsystem 630 (and/or components thereof) generally receives the signals, and the bus 605 then might carry the signals (and/or the data, instructions, etc. carried by the signals) to the working memory 635, from which the processor(s) 610 retrieves and executes the instructions. The instructions received by the working memory 635 may optionally be stored on a storage device 625 either before or after execution by the processor(s) 610.

Figure 7:
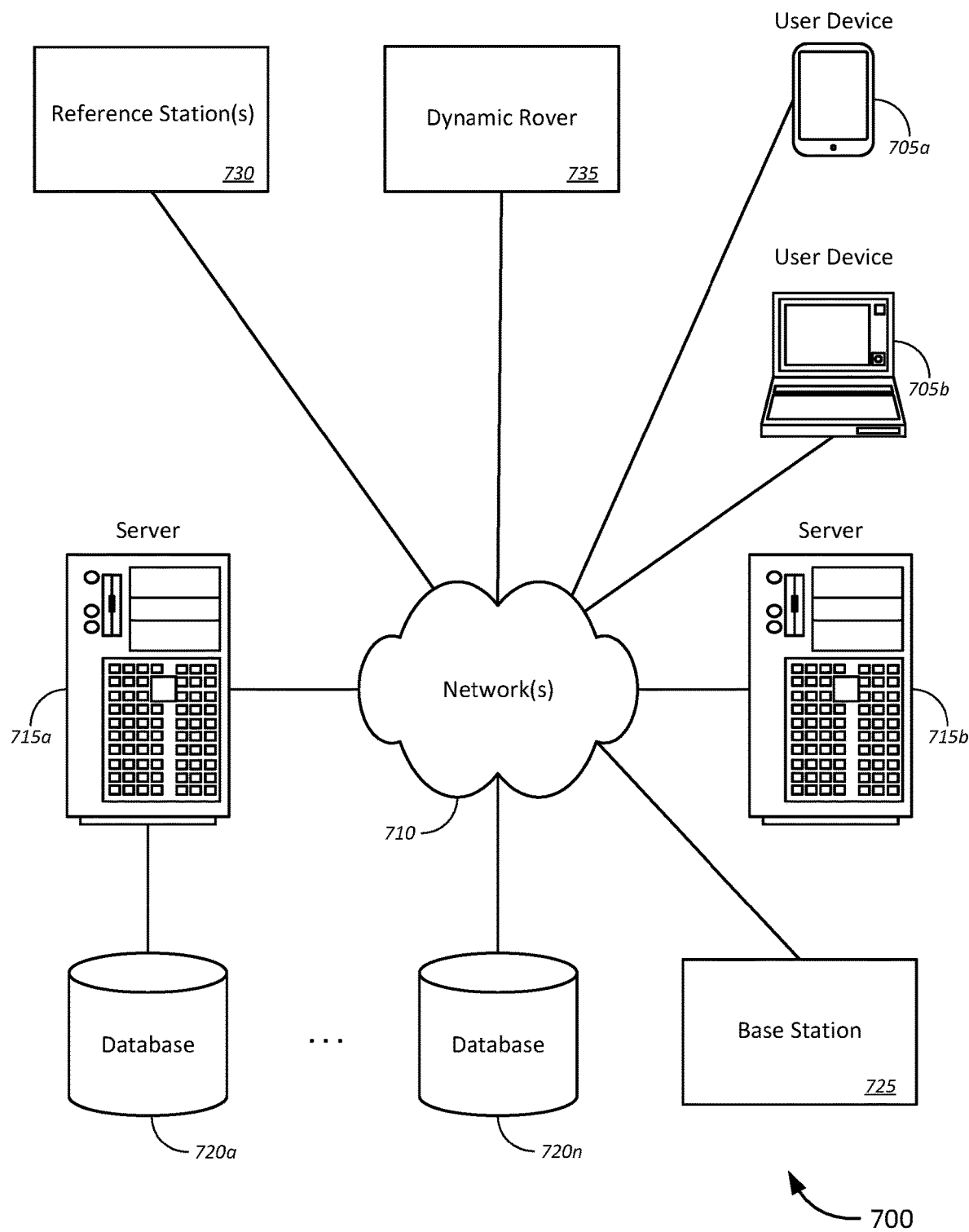
FIG. 7 is a block diagram illustrating a networked system of computing systems, which may be used in accordance with various embodiments.

FIG. 7 is a block diagram illustrating a networked system 700 of computing systems, which may be used in accordance with various embodiments. The system 700 may include one or more user devices 705. A user device 705 may include, merely by way of example, desktop computers, single-board computers, tablet computers, laptop computers, handheld computers, and the like, running an appropriate operating system. User devices 705 may further include external devices, remote devices, servers, and/or workstation computers running any of a variety of operating systems, which may include, in some embodiments, devices which may be used to interface with one or more of the base station, one or more reference stations 730, or dynamic rover 735. In some embodiments, the operating systems may include commercially-available UNIX™ or UNIX-like operating systems. A user device 705 may also have any of a variety of applications, including one or more applications configured to perform methods provided by various embodiments, as well as one or more office applications, database client and/or server applications, and/or web browser applications. Alternatively, a user device 705 may include any other electronic device, such as a thin-client computer, Internet-enabled mobile telephone, and/or personal digital assistant, capable of communicating via a network (e.g., the network(s) 710 described below) and/or of displaying and navigating web pages or other types of electronic documents. Although the exemplary system 700 is shown with two user devices 705, any number of user devices 705 may be supported.

Certain embodiments operate in a networked environment, which can include a network(s) 710. The network(s) 710 can be any type of network familiar to those skilled in the art that can support data communications using any of a variety of commercially-available (and/or free or proprietary) protocols, including, without limitation, MQTT, CoAP, AMQP, STOMP, DDS, SCADA, XMPP, long term evolution, custom middleware agents, Modbus, BACnet, NCTIP 1213, Bluetooth, Zigbee/Z-wave, TCP/IP, SNA™, IPX™, AppleTalk™, and the like. Merely by way of example, the network(s) 710 can each include a local area network ("LAN"), including, without limitation, a fiber network, an ad-hoc network, mesh network, an Ethernet network, a Token-Ring™ network and/or the like; a wide-area network ("WAN"); a wireless wide area network ("WWAN"); a virtual network, such as a virtual private network ("VPN"); the Internet; an intranet; a cellular network, an extranet; a public switched telephone network ("PSTN"); an infra-red network; a wireless network, including, without limitation, a network operating under any of the IEEE 802.11 suite of protocols, the Bluetooth™ protocol, known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, management network, and/or the Internet.

Embodiments can also include one or more server computers 715. Each of the server computers 715 may be configured with an operating system, including, without limitation, any of those discussed above, as well as any commercially (or freely) available server operating systems. Each of the servers 715 may also be running one or more applications, which can be configured to provide services to one or more clients 705 and/or other servers 715.

Merely by way of example, one of the servers 715 might be a data server, a web server, a cloud computing device(s), or the like, as described above. The data server might include (or be in communication with) a web server, which can be used, merely by way of example, to process requests for web pages or other electronic documents from user computers 705. The web server can also run a variety of server applications, including HTTP servers, FTP servers, application servers, database servers, Java servers, and the like. In some embodiments of the invention, the web server may be configured to serve web pages that can be operated within a web browser on one or more of the user computers 705 to perform methods of the invention.

The server computers 715, in some embodiments, might include one or more application servers, which can be configured with one or more applications, programs, web-based services, or other network resources accessible by a client. Merely by way of example, the server(s) 715 can be one or more general purpose computers capable of executing programs or scripts in response to the user computers 705 and/or other servers 715, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™, IBM™, and the like, which can process requests from clients (including, depending on the configuration, dedicated database clients, API clients, web browsers, etc.) running on a user computer, user device, or customer device 705 and/or another server 715. In some embodiments, an application server can perform one or more of the processes for implementing media content streaming or playback, and, more particularly, to methods, systems, and apparatuses for implementing video tuning and wireless video communication using a single device in which these functionalities are integrated, as described in detail above. Data provided by an application server may be formatted as one or more web pages (comprising HTML, JavaScript, etc., for example) and/or may be forwarded to a user computer 705 via a web server (as described above, for example). Similarly, a web server might receive web page requests and/or input data from a user computer 705 and/or forward the web page requests and/or input data to an application server. In some cases, a web server may be integrated with an application server.

In accordance with further embodiments, one or more servers 715 can function as a file server and/or can include one or more of the files (e.g., application code, data files, etc.) necessary to implement various disclosed methods, incorporated by an application running on a user computer 705 and/or another server 715. Alternatively, as those skilled in the art will appreciate, a file server can include all necessary files, allowing such an application to be invoked remotely by a user computer, user device, or customer device 705 and/or server 715.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 720a-720n (collectively, "databases 720"). The location of each of the databases 720 is discretionary: merely by way of example, a database 720a might reside on a storage medium local to (and/or resident in) a server 715a (or alternatively, user device 705). Alternatively, a database 720n can be remote from any or all of the computers 705, 715, 725, 730, 735 so long as it can be in communication (e.g., via the network 710) with one or more of these. In a particular set of embodiments, a database 720 can reside in a storage-area network ("SAN") familiar to those skilled in the art. (Likewise, any necessary files for performing the functions attributed to the computers 705, 715, 725, 730, 735 can be stored locally on the respective computer and/or remotely, as appropriate.) In one set of embodiments, the database 720 may be a relational database configured to host one or more data lakes collected from various data sources, such as the managed object 725, user devices 705, or other sources. Relational databases may include, for example, an Oracle database, that is adapted to store, update, and retrieve data in response to SQL-formatted commands. The database might be controlled and/or maintained by a database server.

The system 700 may further include a base station 725, one or more reference stations 730, and a dynamic rover 735. Each of the base station 725, one or more reference stations 730, and dynamic rover 735 may be coupled to the network 710. In some embodiments, the base station 725 may be configured to provide correction data as described with respect to the previous embodiments. For example, in various embodiments, the base station 725 may be configured to adjust the vertical position of a GNSS antenna based on a vertical error, or alternatively a representative value, of the one or more reference stations. For example, in some embodiments, the base station 725 may be configured to halve the vertical error (or alternatively the representative value for the vertical error (e.g., the mean or median value, the rolling average, etc.)) as described above with respect to previous embodiments. In some embodiments, the base station 725 may be configured to adjust the height of the GNSS antenna according to the relative position of the dynamic rover 735 in relation to the one or more reference stations 730. For example, in some embodiments, a weighting algorithm may be used to adjust the height of the GNSS antenna as a function of the proximity of the dynamic rover 735 to the one or more reference stations 730, as previously described.

The dynamic rover 735 may, accordingly, be configured to perform vertical position corrections based on correction data transmitted by the base station 725 and/or the one or more reference stations 730, via the network 710. Thus, it will be appreciated that the correction data may reflect a more accurate correction relative to a position of the dynamic rover 735.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to certain structural and/or functional components for ease of description, methods provided by various embodiments are not limited to any single structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in sequentially for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a specific structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to one embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A system comprising:
    a reference station comprising a first global navigation satellite system (GNSS) antenna in communication with a GNSS satellite, wherein the reference station is configured to determine a first vertical position and a first vertical error in the first vertical position based, at least in part, on a phase of a carrier wave signal of the GNSS satellite;
    a rover comprising a second GNSS antenna in communication with the GNSS satellite;
    a base station in communication with one or more global navigation satellites, the one or more reference stations, and the rover, the base station comprising:
        a third GNSS antenna;
        an actuator coupled to the third GNSS antenna configured to adjust a vertical position of the third GNSS antenna;
        a wireless transceiver;
        a processor; and
        non-transitory computer readable media comprising instructions executable by the processor to:
            receive, via the reference station, the first vertical error, wherein the first vertical error is based at least in part on the phase of the carrier wave signal when the third GNSS antenna is at a first vertical position;
            determine a second vertical position wherein movement of the third GNSS antenna to the second vertical position produces a modified first vertical error at the reference station less than the first vertical error;
            adjust, via the actuator, the third GNSS antenna to be in the second vertical position;
            generate correction data based at least in part on the phase of the carrier wave signal of the GNSS satellite received by the third GNSS antenna at the second vertical position;
            transmit, via the wireless transceiver, the correction data to the rover;
        wherein the rover is configured to determine a corrected vertical position based, at least in part, on the correction data.

2. The system of claim 1, wherein the second vertical position is determined such that when the third GNSS antenna is moved to the second vertical position, the modified first vertical error that is half of the first vertical error.

3. The system of claim 1, wherein the second vertical position is determined based, at least in part, on a position of the rover relative to the reference station.

4. The system of claim 3, wherein the vertical position instructions are further executable by the processor to:
    determine a distance between the rover and the reference station;
    wherein the second vertical position is determined such that movement of the third GNSS antenna to the second vertical position causes a reduction from the first vertical error to produce the modified first vertical error, wherein the reduction is weighted based on the distance between the rover and the reference station,
    wherein as the distance between the rover and the reference station decreases, the modified first vertical error decreases.

5. The system of claim 1, wherein the first vertical error is determined periodically according to a polling rate, wherein the third GNSS antenna is adjusted to be in the second vertical position according to the polling rate.

6. The system of claim 1, further comprising a plurality of reference stations, the plurality of reference stations comprising the reference station.

7. The system of claim 6, wherein the instructions are further executable by the processor to:
    determine a representative value for each respective vertical error across the plurality of reference stations, wherein the representative value is one of a mean, median, or moving average of each of the respective vertical errors.

8. The system of claim 7, wherein the second vertical position is determined such that when the third GNSS antenna is moved to the second vertical position, a modified representative value is produced, wherein the modified representative value is half of the representative value.

9. The system of claim 7, wherein to determine the representative value each respective vertical error is weighted based, at least in part, on a position of the rover relative to each respective reference station of the plurality of reference stations.

10. An apparatus comprising:
a global navigation satellite system (GNSS) antenna in communication with a GNSS satellite;
an actuator coupled to the GNSS antenna configured to adjust a vertical position of the GNSS antenna;
a wireless transceiver;
a processor; and
non-transitory computer readable media comprising instructions executable by the processor to:
receive, via a reference station, a first vertical error indicative of an error in a measured vertical position of the reference station, wherein the first vertical error is based at least in part on a phase of a carrier wave signal of the GNSS satellite when the GNSS antenna is at a first vertical position;
determine a second vertical position, wherein movement of the GNSS antenna to the second vertical position produces a modified first vertical error at the reference station less than the first vertical error;
adjust, via the actuator, the GNSS antenna to be in the second vertical position;
generate correction data based at least in part on the phase of the carrier wave signal of the GNSS satellite received by the GNSS antenna at the second vertical position; and
transmit, via the wireless transceiver, the correction data to a GNSS rover.

11. The apparatus of claim 10, wherein the second vertical position is determined such that when the GNSS antenna is moved to the second vertical position, the modified first vertical error that is half of the first vertical error.

12. The apparatus of claim 10, wherein the second vertical position is determined based, at least in part, on a position of the GNSS rover relative to the reference station.

13. The apparatus of claim 10, wherein the instructions are further executable by the processor to:
determine a distance between the GNSS rover and the reference station;
wherein the second vertical position is determined such that movement of the GNSS antenna to the second vertical position causes a reduction from the first vertical error to produce the modified first vertical error, wherein the reduction is weighted based on the distance between the GNSS rover and the reference station,
wherein as the distance between the GNSS rover and the reference station decreases, the modified first vertical error decreases.

14. The apparatus of claim 10, wherein the instructions are further executable by the processor to:
determine a representative value for a plurality of respective vertical error across a plurality of reference stations, wherein the representative value is one of a mean, median, or moving average of each of the plurality of respective vertical errors.

15. The apparatus of claim 14, wherein the second vertical position is determined such that when the GNSS antenna is moved to the second vertical position, a modified representative value is produced, wherein the modified representative value is half of the representative value.

16. The apparatus of claim 10, wherein to determine the representative value, each respective vertical error is weighted based, at least in part, on a position of the GNSS rover relative to each respective reference station of the plurality of reference stations.

17. The apparatus of claim 16, wherein the first vertical error is determined periodically according to a polling rate, wherein the GNSS antenna is adjusted to be in the second vertical position according to the polling rate.

18. An method comprising:
receiving, via a base station, a first vertical indicative of an error in a measured vertical position of the reference station, wherein the first vertical error is based at least in part on a phase of a carrier wave signal of the GNSS satellite when a GNSS antenna is at a first vertical position;
determining, via the base station, a second vertical position, wherein movement of the GNSS antenna to the second vertical position produces a modified first vertical error at the reference station less than the first vertical error;
adjusting, via an actuator, the GNSS antenna to be in the second vertical position;
generating, via the base station, correction data based at least in part on the phase of the carrier wave signal of the GNSS satellite received by the GNSS antenna at the second vertical position; and
transmitting, via a wireless transceiver of the base station, the correction data to a GNSS rover.

19. The method of claim 18 further comprising:
adjusting, via the actuator, the GNSS antenna to be in the second vertical position, wherein in the second vertical position the modified first vertical error is half of the first vertical error.

20. The method of claim 18 further comprising:
adjusting, via the actuator, the GNSS antenna to be in the second vertical position, wherein the second vertical position is based, at least in part, on a position of the GNSS rover relative to the reference station.

* * * * *